Figure 1:
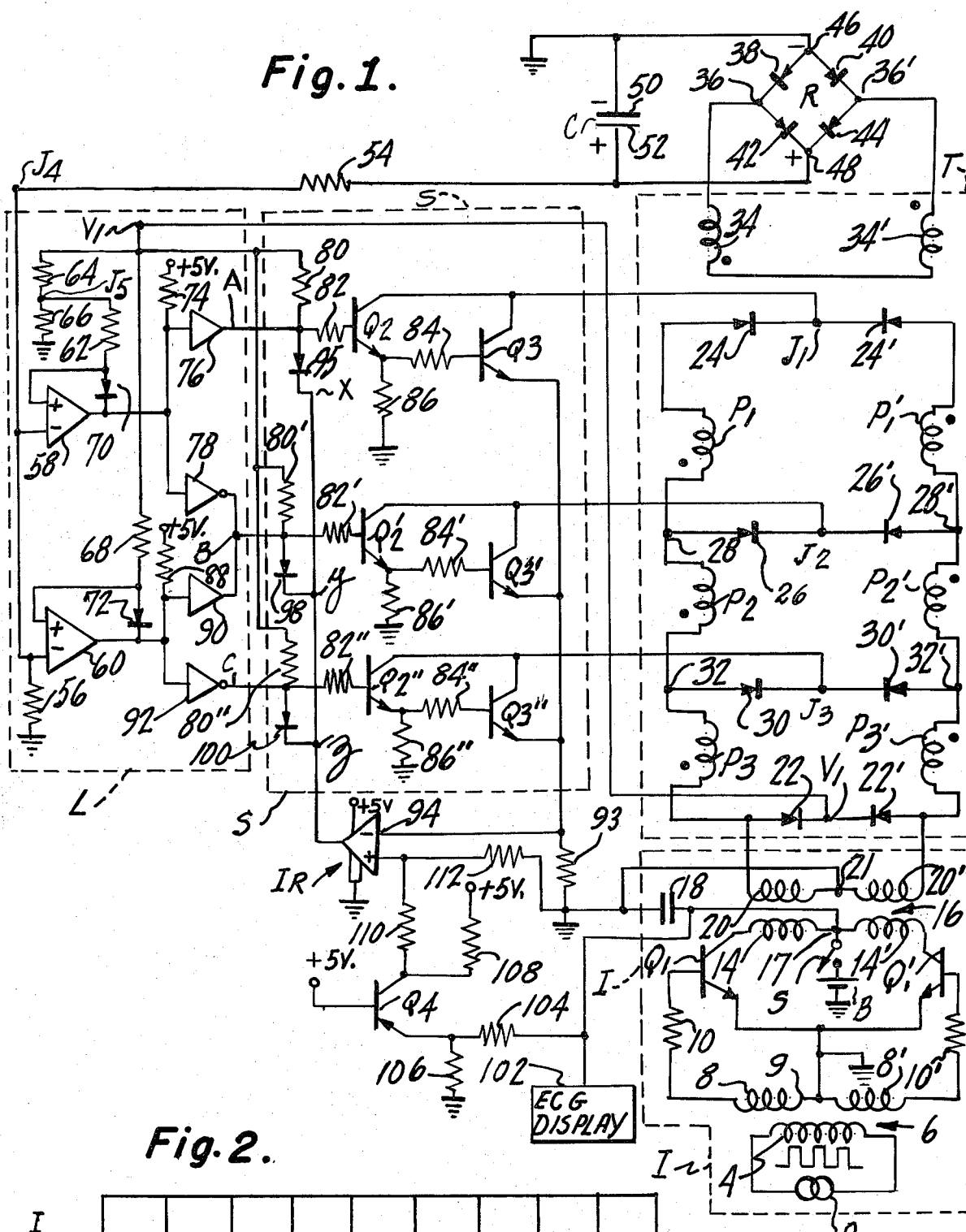

United States Patent [19]

Pirkle

[11] 4,233,659
[45] Nov. 11, 1980

[54] DEFIBRILLATOR CHARGING CURRENT REGULATOR

[75] Inventor: Sherman J. Pirkle, Waltham, Mass.

[73] Assignee: Hewlett-Packard Company, Palo Alto, Calif.

[21] Appl. No.: 867,264

[22] Filed: Jan. 5, 1978

[51] Int. Cl.³ ............................................. H02P 13/00
[52] U.S. Cl. ..................................... 363/134; 363/80; 320/1; 128/419 D
[58] Field of Search ................. 363/59, 64, 74, 134, 363/97, 133, 79–80; 320/1; 128/419 D; 340/635–636; 323/15

[56] References Cited

U.S. PATENT DOCUMENTS

| | | | |
|---|---|---|---|
| 3,258,013 | 6/1966 | Druz | 128/419 D |
| 3,422,269 | 5/1969 | Druz | 128/419 D |
| 3,901,247 | 8/1975 | Walmsley | 340/636 X |
| 4,005,351 | 1/1977 | Blum | 363/79 X |
| 4,075,536 | 2/1978 | Stevens | 363/74 X |
| 4,122,516 | 10/1978 | Tokunaga | 363/79 |

*Primary Examiner*—J. D. Miller
*Assistant Examiner*—Peter S. Wong
*Attorney, Agent, or Firm*—Donald N. Timbie

[57] ABSTRACT

The capacitor of a defibrillator is charged to a high D.C. voltage from a low voltage D.C. source of small capacity by an inverter, a transformer, and a rectifier coupled in sequence. The turns ratio of the transformer is changed as the voltage across the capacitor reaches predetermined levels and the current in the primary of the transformer is regulated by comparing the voltage drop across a small resistor with the voltage of the source.

3 Claims, 2 Drawing Figures

U.S. Patent   Nov. 11, 1980   4,233,659

DEFIBRILLATOR CHARGING CURRENT REGULATOR

BACKGROUND OF THE INVENTION

In my U.S. patent application, Ser. No. 839,076, entitled "Capacitor Charging Circuit", filed on Oct. 3, 1977, a circuit is described for more efficiently and more quickly charging a capacitor to a high voltage from a low voltage small capacity direct current source, such as a small battery. The circuit includes an inverter coupled to the battery for applying pulses of current to the primary winding of a transformer. The secondary winding is coupled to the rectifier that charges the capacitor. Means are provided for regulating the current in the primary winding to a constant value as long as the battery is capable of supplying it. Operation of the defibrillator requires the display of ECG waveforms on an oscilloscope that is powered from the battery. As long as the battery is fresh, it can supply sufficient voltage for the operation of the oscilloscope, but when too much of its energy has been discharged, its output voltage drops to a point where the oscilloscope becomes inoperative. This is due to the fact that the fixed value of regulated current provided by the circuit of the aforementioned patent application produces too much voltage drop through the increased internal resistance of the battery.

BRIEF DISCUSSION OF THE INVENTION

In the circuit of the patent application cited above, the difference between a voltage drop produced by the flow of primary winding current through a small resistor is compared to a fixed reference voltage to control the impedance in the current return path of the primary winding in such manner as to keep the current at a fixed value as long as the battery is capable of providing it. In accordance with the present invention, the reference potential is made to diminish with the battery voltage so as to decrease the regulated value of the current in the primary winding. This reduces the voltage drop produced by the regulated current flowing through the battery so that the battery can provide adequate operating potential to the oscilloscope until the battery has dissipated a greater portion of its energy than before. This means, of course, that it will take longer to charge the storage capacitor to any desired voltage, but it is better to take longer and still be able to produce the ECG waveforms on the oscilloscope, as otherwise the defibrillator is nearly useless.

THE DRAWINGS

Figure 2:
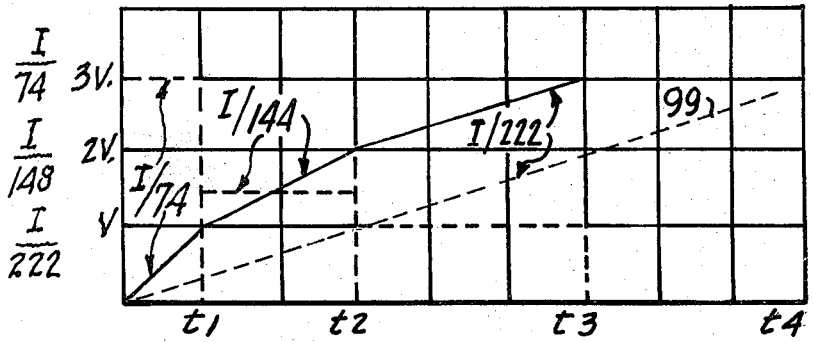

FIG. 1 is a schematic diagram of a circuit for charging a capacitor including a current regulating circuit constructed in accordance with this invention; and FIG. 2 is a set of graphs useful in explaining the operation of the overall charging circuit.

THE CAPACITOR CHARGING CIRCUIT

In general terms, the circuit of FIG. 1 is comprised of an inverter I having a battery B that serves as the power source, an oscillator O, and a transformer T, the turns ratio of which is controlled in accordance with the invention of my U.S. patent application Ser. No. 839,076, filed Oct. 3, 1977. The circuit also includes a rectifier R, a capacitor C to be charged, logic circuits L for controlling the switches S so as to select the turns ratio of the transformer T in response to the voltage across the capacitor C, and a current regulator IR.

Specifically, the oscillator O is coupled to a primary winding 4 of a transformer 6 having secondary winding sections 8 and 8' that are grounded at a center tap 9. The emitters of transistors $Q_1$ and $Q_1'$ are connected to the center tap 9, and the collectors are respectively connected to the outer ends of sections 14 and 14' of primary winding of a coupling transformer 16. The inner ends of the sections 14 and 14' are connected to a center tap 17 that is connected to the positive side of the battery B via a switch S and bypassed to ground by a capacitor 18. The negative side of the battery B is connected to ground. The secondary winding of the transformer 16 is comprised of sections 20 and 20' having their inner ends connected to ground at a center tap 21. Diodes 22 and 22' are connected in series opposition between the outer ends of the windings 20 and 20' so as to provide a rectified voltage $V_1$ at their junction that varies with the voltage supplied by the battery B. The coupling transformer 16 may provide a voltage step up, e.g., each of the sections 14 and 14' of the primary may have twenty turns and each of the winding sections 20 and 20' of the secondary may have sixty turns.

In this particular illustration, the primary winding of the transformer T is split into two parts, one part being comprised of series sections $P_1$, $P_2$ and $P_3$ which may, for example, respectively have twenty-seven, nine, and eighteen turns, and the other part being comprised of identical corresponding series sections $P_1'$, $P_2'$ and $P_3'$. The outer ends of the winding section $P_3$ is connected to the ungrounded end of the secondary winding 20 of the coupling transformer 16, and the outer end of the winding section $P_1$ is connected via the anode cathode path of a diode 24 to a junction $J_1$. Similarly, the outer end of the winding section $P_3'$ is connected to the ungrounded end of the secondary winding 20' of the transformer 16, and the outer end of the winding $P_1'$ is connected to the junction $J_1$ via the anode cathode path of a diode 24'. Diodes 26 and 26' have their cathodes connected to a junction $J_2$ and their anodes respectively connected to points 28 and 28' between the primary winding sections $P_1$ and $P_2$ and the primary winding sections $P_1'$ and $P_2'$. The cathodes of diodes 30 and 30' are connected to a junction $J_3$ and their anodes are respectively connected to points 32 and 32' between the primary winding sections $P_2$ and $P_3$ and the primary winding sections $P_2'$ and $P_3'$.

The secondary winding of the transformer T has one section 34 magnetically coupled to the primary winding sections $P_1$, $P_2$ and $P_3$, and another section 34' magnetically coupled to the primary winding sections $P_1'$, $P_2'$ and $P_3'$. The secondary windings 34 and 34', each of which may have 2,000 turns, are connected in series between the input terminals 36 and 36' of the rectifier R. The rectifier R is comprised of a first pair of diodes 38 and 40 connected in series with opposing polarities between the input terminals 36 and 36' and a second pair of diodes 42 and 44 connected in series between the input terminals 36 and 36' with their respective polarities opposite to the polarities of the diodes 38 and 40. The grounded output terminal 46 and the output terminal 48 of the rectifier R are respectively at the junctions of the diodes 38 and 40 and 42 and 44, and they are respectively connected to opposite plates 50 and 52 of the capacitor C that is to be charged. The winding senses of the various windings of the transformer T are such that the voltages applied to the inputs 36 and 36' of the rectifier R are out of phase.

THE LOGIC AND SWITCHING CIRCUITS

The logic circuits L and switching circuits S successively disable the pairs of primary winding sections $P_1$ and $P_1'$ and $P_2$ and $P_2'$ as the direct current voltage across the capacitor C reaches successive predetermined levels so as to increase the voltage applied to the capacitor C in steps.

A potential divider comprised of a large resistor 54 and a small resistor 56 are connected in series between ground and the positive output terminal 48 of the rectifier R so as to provide a voltage at their junction $J_4$ that is proportional to the voltage across the capacitor C and small enough for application to the inverting inputs of open collector comparators 58 and 60 to which $J_4$ is connected. A reference voltage for the comparator 58 is supplied via an isolation resistor 62 from the junction $J_5$ of resistors 64 and 66 that are connected in series between ground and the junction of the diodes 22 and 22' at which the rectified voltage $V_1$ appears. A reference voltage equal to $V_1$ is supplied to the non-inverting input of the comparator 60 via an isolating resistor 68. In order to prevent the non-inverting inputs of the comparators 58 and 60 from coming too close to ground when their outputs are low, diodes 70 and 72 are respectively connected between their outputs and their non-inverting inputs.

The output of the comparator 58 is connected to a positive voltage, such as +5 v, via a resistor 74, to the input of a non-inverting open collector buffer 76 and to the input of an open collector inverting buffer 78. The output of the buffer 76 is connected by a resistor 80 to a point to which $V_1$ is applied and by a resistor 82 to the base of a transistor $Q_2$. The emitter of the transistor $Q_2$ is connected to the junction of resistors 34 and 36 that are connected in series between the base of transistor $Q_3$ and ground, and the collectors of transistors $Q_2$ and $Q_3$ are connected to the junction $J_1$.

The output of the comparator 60 is connected to a positive voltage, such as +5 v, via a resistor 88, to the input of a non-inverting buffer 90 and to the input of an inverting buffer 92. The output of the inverting buffer 78 previously mentioned and the output of the non-inverting buffer 90 are connected to an output circuit like that described in connection with the buffer 76 in which corresponding components are indicated by the same letter or numeral primed. The collectors of transistors $Q_2'$ and $Q_3'$ are connected to the junction $J_2$.

The output of the inverting buffer 92 is connected to an output circuit like that provided for the buffer 76 in which corresponding components are indicated by the same letters or numerals with a double prime. The collectors of the transistors $Q_2''$ and $Q_3''$ are connected to the junction $J_3$.

The current return paths from the junctions $J_1$, $J_2$ and $J_3$ are respectively through the collector-to-emitter paths of one of the transistors $Q_3$, $Q_3'$ and $Q_3''$ and a small resistor 93 to the center tap 21 between the secondary winding sections 20 and 20' of the transformer 16.

The current regulating circuit IR maintains a constant current in the primary windings of the transformer T. It is comprised of an open collector differential amplifier 94 having its output respectively connected via diodes 95, 98 and 100 to the outputs of the buffers 76, 78 and 90, 92. The non-inverting input of the amplifier 94 is connected to a small positive voltage, such as +5 v, and its inverting input is connected to one end of the resistor 93. The other end of the resistor 93 is connected to ground.

OPERATION

When the charging of the capacitor C is started by closing the switch S, the voltage applied to the inverting inputs of the comparators 58 and 60 is zero so that their outputs are high. Application of the high voltage from the comparator 58 through the buffer 76 to the base of transistor $Q_2$ turns on transistors $Q_2$ and $Q_3$ so as to provide a current return path from the junction $J_1$ through the collector and emitter of transistor $Q_3$ to the center tap 21. No current return path is provided through transistor $Q_3'$ for the junction $J_2$ because transistors $Q_3'$ and $Q_2'$ are turned off by the low output from the inverting buffer 78 that dominates the high output of the non-inverting buffer 90. Nor is any return path provided through transistor $Q_3''$ for the junction $J_3$ because transistors $Q_2''$ and $Q_3''$ are turned off by the low output of the inverting buffer 92. In this situation, current flows through all the primary winding sections of the transformer T so that the effective turns ratio is $4000/54 = 74$. If the current in the primary windings is I amperes, the current in the secondary windings is I/74, so that it takes until $t_1$, as shown in FIG. 2, to charge the capacitor C to V volts.

At this point, or slightly before, for reasons that will be explained, the voltage at the inverting input of the comparator 58 exceeds the reference voltage applied to its non-inverting input so as to cause its output to change from a high to a low voltage. The low voltage turns off transistors $Q_2$ and $Q_3$ and, because of the inversion of this low voltge to a high voltage in the inverting buffer 78, transistors $Q_2'$ and $Q_3'$ are turned on so as to provide a return path for the junction $J_2$. The transistors $Q_2''$ and $Q_3''$ remain off. Current flows through only the primary windings $P_2$ and $P_3$ and $P_2'$ and $P_3'$, so that the turns ratio becomes $4000/27 = 148$, thereby reducing the current charging the capacitor C to I/148 amperes. Accodingly, it takes twice as long for the voltage on the capacitor C to be increased by V volts so as to reach a total voltage of 2 V volts at time $t_2$, as shown in FIG. 2.

At this time, the voltage applied to the inverting input of the comparator 60 is equal to the reference voltage at its non-inverting input so as to cause its output to change to a low voltage. This voltage is inverted to a high voltage in the buffer 92 so as to turn on transistors $Q_2''$ and $Q_3''$ and provide a return path for the junction $J_3$ through transistor $Q_3''$. Current flows only in the primary winding sections $P_3$ and $P_3'$ so that the turns ratio is $4000/18 = 222$. A current I/222, therefore, flows into the capacitor C so as to require three times as much time to increase its voltage by V volts as when the current was I/74 amperes between time zero and the time $t_1$. The capacitor C is fully charged to 3 V at the time $t_3$, as shown in FIG. 2.

If, however, only one turns ratio is used, as in previously known apparatus, it would have to be 222 because that is the only one high enough to provide the required voltage of 3 V. The charging current would be I/222 amperes, the same as between $t_2$ and $t_3$ so that the increase in voltage would be along the dotted line 98. If the primary current I were held constant, it would take until $t_4$ to charge the capacitor C to a voltage of 3 V or one and one-half times as long as when the circuit of this invention is used. The charging currents during each charging step are indicated by the dotted lines in FIG. 2.

Due to various tolerances, the voltage across the capacitor C could reach a terminal voltage that is less than the ideal switching voltage, in which event the switching voltage will never be attained. Therefore, it is desirable to cause the logic circuits to change the turns ratio so as to increase the voltage at a voltage that is less than the next step. An adjustment of 10% has been found to be satisfactory to accommodate tolerance in components.

The theoretical efficiency of the charging process is the energy stored in the capacitor divided by the energy given up by the battery and is expressed by the formula:

$$(N/N+1) \times 100$$

where N equals the number of steps and where the turns ratios are arithmetically related. Thus, the efficiency of the prior art is 50% and the efficiency of the three-step charging system described is 75%. More steps could be used, but the incremental advantage becomes less, e.g., a four-step system would have an efficiency of 80%. The number of steps used is a matter of cost vs. gain in efficiency.

The graphs of FIG. 2 do not show the effect of impedance that is always present. If this were taken into account, the voltage across the capacitor C would increase less rapidly as it approached the charging voltage, but the relative advantages of charging a capacitor in accordance with this invention would be approximately the same.

An advantage in deriving the reference potentials for the non-inverting inputs of the comparators 58 and 60 from the voltage $V_1$ is that if the voltage supplied by the battery B decreases, the charging circuit will still be able to proceed through its steps and reach the highest charging voltage that the condition of the battery will permit. If a fixed or regulated voltage were substituted in place of $V_1$, the maximum voltage to which the capacitor C can be charged may not be high enough to cause the comparator 58 to change state and cause the voltage applied to the capacitor C to increase to the next step.

It is to be noted that the improvement in efficiency is greater for lower voltage levels and that, due to design allowance for line battery variations, the maximum voltage for which it is designed to charge is almost always higher than that which could be reached under optimum conditions.

The circuits are designed so as to be able to charge the capacitor C to the desired maximum voltage even when the voltage of the battery or other sources of charging energy is low. Therefore, when the voltage of the source is farily high, it is not necessary to utilize all the voltage steps available. In this situation, the efficiency of a charging circuit utilizing this invention is even greater than that of a prior art circuit.

THE CURRENT REGULATING CIRCUIT

As the current in the active primary winding section or sections of the transformer T decreases, the positive voltage at the undergrounded end of the resistor 93 drops. When it gets below the positive reference voltage applied to the non-inverting input of the amplifier 94, the output of the amplifier becomes more positive. This decreases the current in the diode 95, 98 or 100 is conducting; the others being turned off. The diode that conducts is the one connected to the transistor $Q_2$, $Q_2'$ or $Q_2''$ that is conducting or active. As current from the base of this transistor increases, the current through the transistor $Q_3$, $Q_3'$ or $Q_3''$ to which it is coupled will increase, thus restoring the primary current to its former value.

When the switch S is closed, the positive terminal of the battery B is connected so as to supply the operating voltage required by the ECG display 102. When the battery is fresh, the current in the active primary windings of the transformer T can be greater than when the battery B is fairly well discharged without interfering with the operation of the ECG display 102. In accordance with this invention, means are provided for lowering the value of the regulated primary current as the voltage of the battery B decreases. The particular means illustrated for this purpose includes a voltage divider comprised of resistors 104 and 106 connected in series between ground and the junction 17 of the windings 14 and 14'. The emitter of a PNP transistor $Q_4$ is connected to the junction of the resistors, its base is connected to a point of fixed potential, such as +5 volts, and its collector is connected via a resistor 108 to a point of positive potential, such as +5 volts. The collector of the transistor $Q_4$ is also connected to the non-inverting input of the amplifier 94 via a resistor 110. A resistor 112 is connected between the non-inverting input of the amplifier 94 and ground. Normally, the voltages at the junction of the voltage divider resistors 104 and 106 will be such that $Q_4$ will conduct. Its collector voltage, which will be slightly higher than +5 volts, is applied to the non-inverting input of the amplifier 94. This causes the voltage at the output of the amplifier 94 to bias the active one of the diodes 95, 98 or 100 so as to cause the corresponding one of the transistors $Q_3$, $Q_3'$ or $Q_3''$ to have a resistance such that the current in the active primary winding is kept at its design value. When, however, the battery B is fairly well discharged, its internal impedance will be greater, so that if the current in the primary winding is maintained at a high value that is satisfactory when the battery is fresh, it will lower the battery voltage to a point where the ECG display 102 becomes inoperative. As the voltage of the battery B decreases in the circuit described, the voltage at the emitter of $Q_4$ also decreases. This reduces the voltage applied to the non-inverting input of the amplifier 94 and decreases its output so that the active one of the diodes 95, 98 or 100 takes more current. This causes the corresponding one of the transistors $Q_3$, $Q_3'$ or $Q_3''$ to increase its impedance and hold the primary winding current at lower value than it would otherwise do.

What is claimed is:
1. The combination of
   a battery,
   an inverter having an input and an output, said input being coupled to said battery,
   a transformer having primary and secondary windings, said primary winding being coupled to said output of said inverter,
   a rectifier having an input and an output, said input being coupled to said secondary winding of said transformer,
   a capacitor to be charged coupled to the output of said rectifier,
   a plurality of variable impedance devices,
   switching means coupled to said capacitor for connecting different points on said primary winding through a respective one of said variable impe- dance devices so as to provide a current return path to said inverter as the voltage across said capacitor increases through pedetermined values, a resistor connected in series with said variable impedance devices, and means for varying the impedance of the variable impedance device that is in the current return path in accordance with a comparison between the voltage across said resistor and the voltage of said battery.

2. In a defibrillator, the combination of a battery, a visual display device coupled to said battery so as to be powered thereby, an inverter having an input and an output, said input being coupled to said battery, a transformer having primary and secondary windings, said primary winding being coupled to said output of said inverter, a rectifier having an input and an output, said input being coupled to said secondary winding of said transformer, a capacitor to be charged coupled to the output of said rectifier, and means for maintaining the current in said primary winding at a value determined by the current and the voltage of said battery so as to prevent said current from reducing the voltage of said battery to a point where the operation of said visual display means is impaired.

3. A circuit for deriving a high direct current charging potential for a capacitor from a source of direct current voltage having a lower value comprising, input terminals between which a source of direct current potential may be connected, one terminal being connected to a point of reference potential, an inverter having an input and an output, said input being connected to said input terminals, a transformer having primary and secondary windings one end of said primary winding being coupled to the output of said inverter, a rectifier having output terminals between which a capacitor may be connected and input terminals, said input terminals being coupled to said secondary winding of said transformer, one of said output terminals being connected to said point of reference potential, a resistor having one end connected to said point of reference potential, a plurality of variable impedances, each having one side thereof coupled to a different point on said primary winding of said transformer and the other side thereof connected to the other end of said resistor, each of said impedances normally having a high value, switching means responsive to the voltage at the output of said rectifier for causing said variable impedance connected to the point on said primary winding that is most remote from the end of the primary winding that is coupled to said inverter to have a low value only while said voltage is below a given value and to cause a variable impedance that is connected to the point on said primary winding of said transformer that is next nearer to the end of said primary winding that is coupled to said inverter to have a low value only when the said voltage is greater than said given value, and means for tending to change the value of the one of said variable impedances having a low value in the same sense as the change in the voltage across said resistor and in the opposite sense with respect to changes in a direct current voltage appearing between said input terminals.

* * * * *

UNITED STATES PATENT AND TRADEMARK OFFICE
CERTIFICATE OF CORRECTION

PATENT NO.  : 4,233,659
DATED       : November 11, 1980
INVENTOR(S) : Sherman J. Pirkle It is certified that error appears in the above-identified patent and that said Letters Patent are hereby corrected as shown below:

| Column 3 | line 37 | "34 and 36" should read -- 84 and 86 -- |
| Column 5 | line 62 | "undergrounded" should read -- ungrounded -- |

Signed and Sealed this

Thirty-first Day of March 1981

[SEAL]

Attest:

RENE D. TEGTMEYER

Attesting Officer

Acting Commissioner of Patents and Trademarks